(12) United States Patent  
Bishop et al.

(10) Patent No.: US 8,489,863 B2  
(45) Date of Patent: *Jul. 16, 2013

(54) PROCESSOR INCLUDING AGE TRACKING OF ISSUE QUEUE INSTRUCTIONS

(75) Inventors: James Wilson Bishop, Newark Valley, NY (US); Mary Douglass Brown, Austin, TX (US); Jeffrey Carl Brownscheidle, Winooski, VT (US); Robert Allen Cordes, Austin, TX (US); Maureen Anne Delaney, Burlington, VT (US); Jafar Nahidi, Round Rock, TX (US); Dung Quoc Nguyen, Austin, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,055

(22) Filed: Apr. 19, 2012

(65) Prior Publication Data

US 2012/0260069 A1 Oct. 11, 2012

Related U.S. Application Data

(63) Continuation of application No. 12/417,878, filed on Apr. 3, 2009.

(51) Int. Cl.
*G06F 15/00* (2006.01)
*G06F 9/30* (2006.01)
*G06F 9/40* (2006.01)

(52) U.S. Cl.
USPC .............................. 712/214; 712/220; 712/216

(58) Field of Classification Search
None
See application file for complete search history.

(56) References Cited

U.S. PATENT DOCUMENTS 5,754,812 A * 5/1998 Favor et al. .................... 712/216
6,178,497 B1 1/2001 Frederick et al.

(Continued)

OTHER PUBLICATIONS

USPTO U.S. Appl. No. 12/417,878.

(Continued)

*Primary Examiner* — Andrew Caldwell
*Assistant Examiner* — George Giroux
(74) *Attorney, Agent, or Firm* — Francis Lammes; Stephen J. Walder, Jr.; Diana R. Gerhardt

(57) ABSTRACT

An information handling system includes a processor with an instruction issue queue (IQ) that may perform age tracking operations. The issue queue IQ maintains or stores instructions that may issue out-of-order in an internal data store (IDS). The IDS organizes instructions in a queue position (QPOS) addressing arrangement. An age matrix of the IQ maintains a record of relative instruction aging for those instructions within the IDS. The age matrix updates latches or other memory cell data to reflect the changes in IDS instruction ages during a dispatch operation into the IQ. During dispatch of one or more instructions, the age matrix may update only those latches that require data change to reflect changing IDS instruction ages. The age matrix employs row and column data and clock controls to individually update those latches requiring update.

7 Claims, 6 Drawing Sheets

U.S. PATENT DOCUMENTS

| | | | |
|---|---|---|---|
| 6,266,767 | B1 | 7/2001 | Feiste et al. |
| 6,542,988 | B1 | 4/2003 | Tremblay et al. |
| 6,654,876 | B1 | 11/2003 | Le et al. |
| 6,735,685 | B1 | 5/2004 | Senter et al. |
| 6,785,802 | B1 | 8/2004 | Roy |
| 7,350,056 | B2 | 3/2008 | Abernathy et al. |
| 2003/0188107 | A1 | 10/2003 | Hill et al. |
| 2008/0320016 | A1 | 12/2008 | Singh et al. |
| 2008/0320274 | A1* | 12/2008 | Singh et al. .............. 712/23 |

OTHER PUBLICATIONS

Bian, Z et al., "Development of AR Tracking Method for NPP Maintenance Work Support", SICE Annual Conference 2005 in Okayama, Aug. 2005, pp. 69-73.

Castro, Fernando et al., "DMDC: Delayed Memory Dependence Checking through Age-Based Filtering", 39th Annual IEEE/ACM International Symposium on Microarchitecture, Dec. 2006, 10 pages.

Sassone, Peter G. et al., "Matrix Scheduler Reloaded", 34th International Symposium on Computer Architecture (ISCA-34) Intel Microarchitecture Research lab (MRL), Jun. 2007, 12 pages.

Vivekanandham, Rajesh et al., "A Scalable Low Power Issue Queue for Large Instruction Window Processors", Proceedings of the 20th Annual International Conference on Supercomputing, Aug. 2006, pp. 167-176.

Office Action mailed Jun. 5, 2012 for U.S. Appl. No. 12/417,878, 14 pages.

Interview Summary mailed Sep. 10, 2012, U.S. Appl. No. 12/417,878, 3 pages.

Notice of Allowance mailed Oct. 12, 2012 for U.S. Appl. No. 12/417,878, 10 pages.

Response to Office Action filed Sep. 5, 2012, U.S. Appl. No. 12/417,878, 16 pages.

\* cited by examiner

AGE MATRIX LATCH
LOGIC DIAGRAM

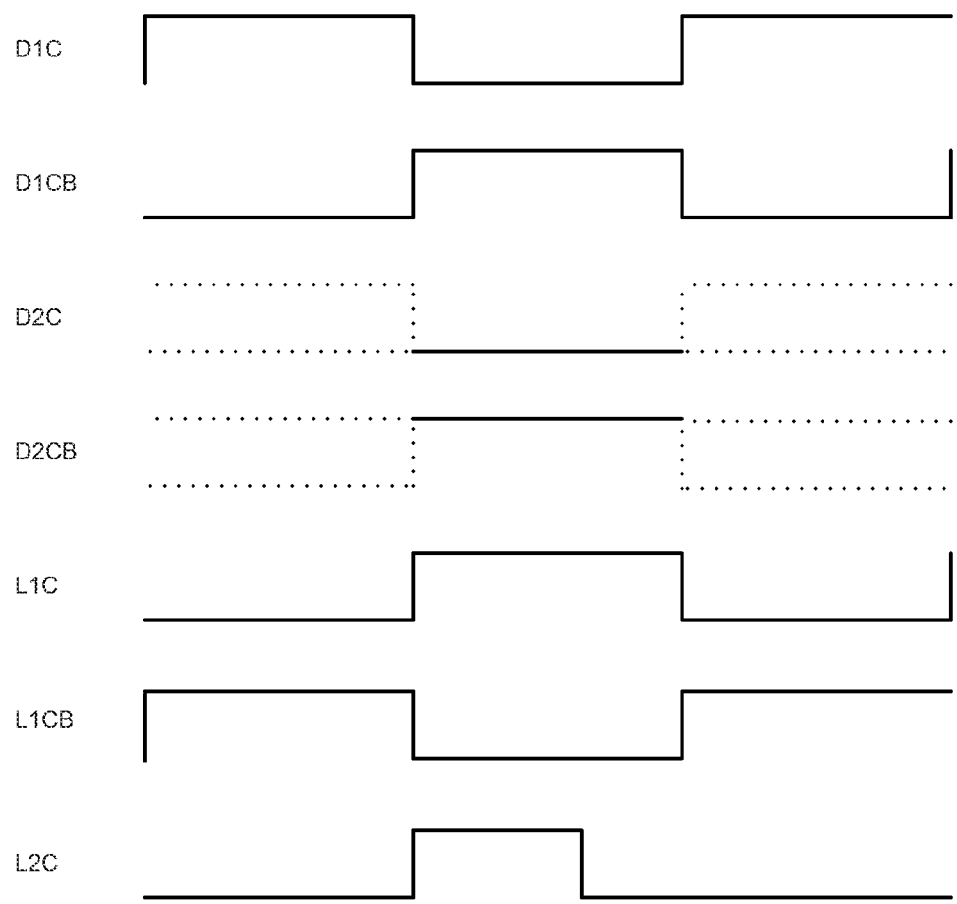

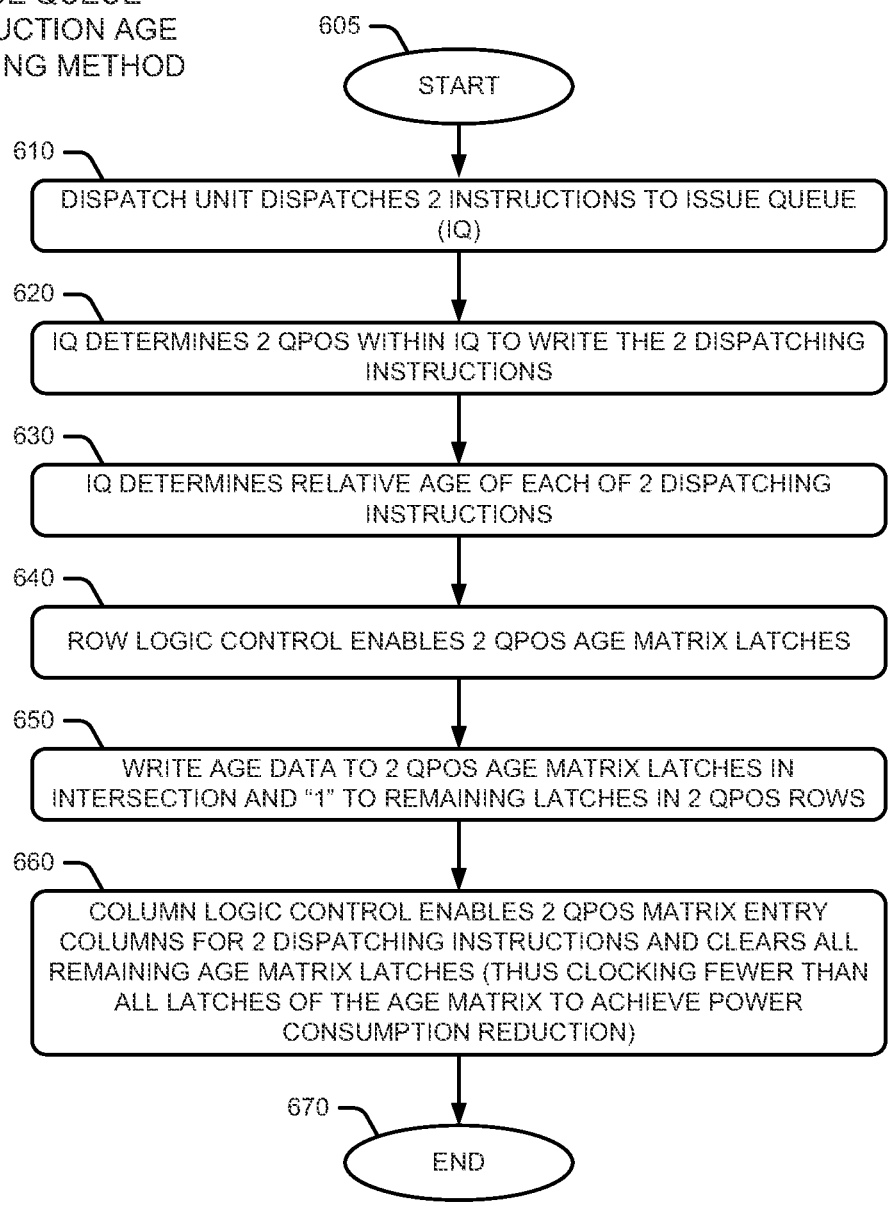

PROCESSOR INCLUDING AGE TRACKING OF ISSUE QUEUE INSTRUCTIONS

This application is a continuation of application Ser. No. 12/417,878, filed Apr. 3, 2009, status pending.

This invention was made with United States Government support under Agreement No. HR0011-07-9-0002 awarded by DARPA. The Government has certain rights in the invention.

BACKGROUND

The disclosures herein relate generally to processors, and more specifically, to processors that employ issue queues with instruction age tracking management.

Modern information handling systems (IHSs) often execute instructions out-of-order to achieve greater processing efficiency. Because out-of-order instruction handling is common in modern IHSs, processors typically track the dependency characteristics between instructions in an instruction issue queue. Another characteristic that processors track for instructions in an issue queue is the age of the instructions. The instruction age corresponds to the dispatch order that a particular instruction exhibits in an issue queue relative to other instructions of that issue queue. For example, the last instruction to dispatch to an issue queue is known at the youngest instruction in that issue queue. Alternatively, the oldest instruction residing in an issue queue is the oldest instruction of that issue queue relative to all other instructions of that issue queue.

Many issue queues maintain or store a relative age from oldest through youngest for all instructions that the issue queue stores. The age of a particular instruction is one of multiple characteristics that an issue queue may maintain or store for that particular instruction. For example, a particular instruction may not issue from the issue queue until dependencies for that particular instruction are met. These dependencies may include, data dependencies, address dependencies, and other dependencies. A processor may select the oldest instruction to issue to an execution unit when the processor determines that dependencies for that particular instruction are met. That particular instruction may issue to an execution unit within the processor for further processing.

An issue queue may employ an age matrix to manage age data for each instruction within that issue queue. An age matrix is a matrix or array of data that determines each instructions relative age or dispatch order relative to other instructions within an issue queue. An issue queue may update the age matrix data during the issue of any particular instruction to an execution unit, or upon the dispatch of any new instruction into the issue queue. An issue queue age matrix may update latches or other memory cell data to maintain instruction age information. Updating latches within an age matrix may require latch clocking and the consumption of important processor power resources. Processor power resources may be of particular concern to IC designers and other entities.

BRIEF SUMMARY

Accordingly, in one embodiment, a method of processing instructions is disclosed. The method includes providing, by an instruction source, a stream of instructions. The method also includes decoding, by a decoder, the stream of instructions to provide decoded instructions. The method further includes dispatching, by a dispatcher, decoded instructions to an issue queue that includes an instruction data store (IDS) having a plurality of queue positions that store the dispatched instructions. The issue queue also includes an age matrix for managing the relative age of each dispatched instruction stored in the IDS with respect to other dispatched instructions stored in the IDS, the age matrix including a plurality of memory cells configured in a number of rows and a number of columns.

During the dispatching of at least one instruction, the at least one instruction is stored in the IDS, the issue queue updating the age matrix to reflect the age of the at least one instruction relative to other instructions in the issue queue. During the dispatching of the at least one instruction the issue queue modifies the age matrix row and column memory cells that correspond to the at least one instruction's queue position to reflect the relative age of the at least one instruction with respect to other instructions in the IDS. In one embodiment, the method also includes selectively clocking, by a row and column logic controller, a row and a column of the age matrix that correspond to the at least one instruction's queue position.

In another embodiment, a processor is provided. The processor includes an instruction source that provides an instruction stream including a plurality of instructions. The processor also includes a decode unit, coupled to the instruction source, that decodes the instructions of the instruction stream to provide decoded instructions. The processor further includes a dispatch unit, coupled to the decode unit, that dispatches decoded instructions as dispatched instructions. The processor still further includes an instruction queue, coupled to the dispatch unit, to receive dispatched instructions therefrom. The issue queue includes an instruction data store (IDS) having a plurality of queue positions that store the dispatched instructions. The issue queue further includes an age matrix for managing the relative age of each dispatched instruction stored in the IDS with respect to other dispatched instructions stored in the IDS, the age matrix including a plurality of memory cells configured in a number of rows and a number of columns.

During the dispatching of at least one instruction, the at least one instruction is stored in the IDS, and the issue queue updates the age matrix to reflect the age of the at least one instruction relative to other instructions in the issue queue. During the dispatching of the at least one instruction the issue queue modifies the age matrix row and column memory cells that correspond to the at least one instruction's queue position to reflect the relative age of the at least one instruction with respect to other instructions in the IDS. In one embodiment, the processor also includes a row and column logic controller, coupled to the memory cells of the age matrix, that selectively clocks a row and a column of the age matrix that correspond to the at least one instruction's queue position.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 5 is a timing diagram that depicts timing waveforms for the age matrix that employs the processor with IQ instruction age tracking methodology.

FIG. 6 is a flowchart that shows process flow in the processor of FIG. 2 as it employs the IQ instruction age tracking methodology.

DETAILED DESCRIPTION

One embodiment of the disclosed information handling system (IHS) employs a processor that includes an issue queue (IQ). The IQ may employ an age matrix to manage the relative age for each instruction within the IQ. The age of an instruction corresponds to the relative timing of the dispatch, of that instruction into the IQ. In other words, the last instruction to dispatch into the IQ is the youngest instruction within the IQ. In the case where a dispatch unit dispatches multiple instructions to the IQ during the same processor cycle, the IQ and age matrix may maintain a relative instruction age that corresponds to the order of each dispatching instruction within the instruction stream. In other words, in one embodiment, the age matrix of the IQ maintains information regarding the relative order of instruction dispatch and information regarding the sequential instruction stream order.

In one embodiment, the IQ employs an age matrix of N×N cells wherein N is the number of instruction entries of the IQ. In other words, an IQ that stores N instructions may employ, an N×N matrix of binary data cells, such as latches, to represent the relative age of each instruction of the IQ. In one embodiment, the N row data for a particular entry of the age matrix corresponds to the age of that instruction in the IQ. An IQ may update all of the data in the age matrix, including both row and column data, each time a new instruction stores or dispatches to the IQ.

In one embodiment, each cell of an age matrix is a binary latch. In that case, the IQ employs processor power supply resources during the update of each cell in the age matrix. For example, during the dispatch of one instruction into the IQ, the processor may clock and update each cell within that IQ's age matrix. The disclosed processor manages power utilization in the age matrix of the issue queue IQ. In one embodiment of the disclosed processor, the IQ may limit the update of latches within the age matrix to include only those latches requiring modification during instruction dispatch. In that case, the processor reduces power consumption by updating only that portion of the age matrix that requires modification in response to a dispatch operation.

Figure 1:
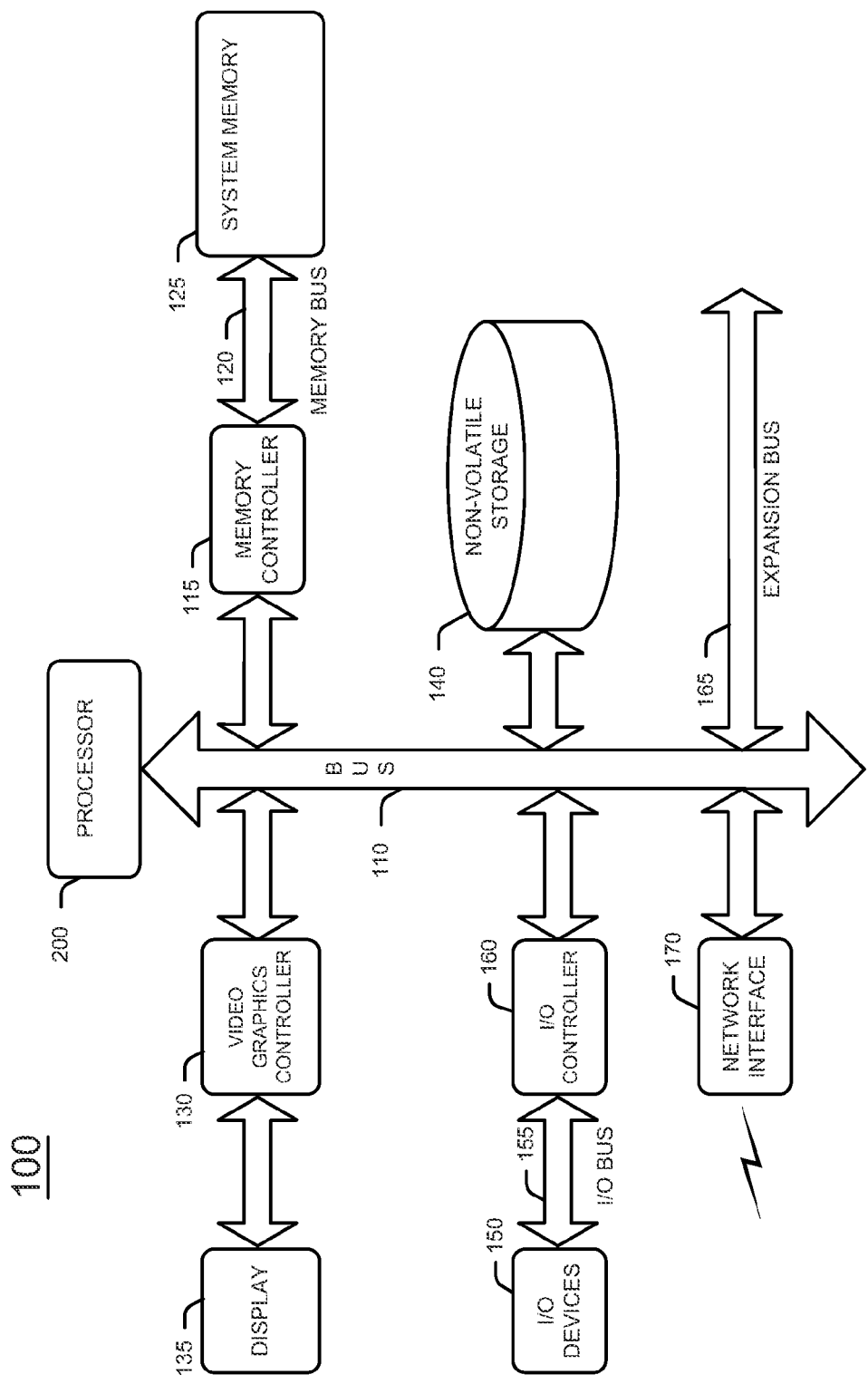
FIG. 1 is block diagram of an information handling system (IHS) that includes the disclosed processor with issue queue (IQ) instruction age tracking methodology.

FIG. 1 shows an information handling system (IHS) 100 that includes a processor 200 that may employ the disclosed IQ instruction age tracking method. Processor 200 couples to a bus 110. A memory controller 115 couples to bus 110. A memory bus 120 couples system memory 125 to memory controller 115. A video graphics controller 130 couples display 135 to bus 110. IHS 100 includes nonvolatile storage 140, such as a hard disk drive, CD drive, DVD drive, or other nonvolatile storage that couples to bus 110 to provide IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA. SATA, eSATA, PCI, PCIE and other busses, couple to bus 110 to facilitate the connection of peripherals and devices to IHS 100. A network interface 170 couples to bus 110 to enable IHS 100 to connect by wire or wirelessly to other network devices. IHS 100 may take many forms. For example, IHS 100 may take the form of a desktop, server, portable, laptop, notebook, or other form factor computer or data processing system. IHS 100 may also take other form factors such as a personal digital assistant (PDA), a gaming device, a portable telephone device, a communication device or other devices that include a processor and memory.

Figure 2:
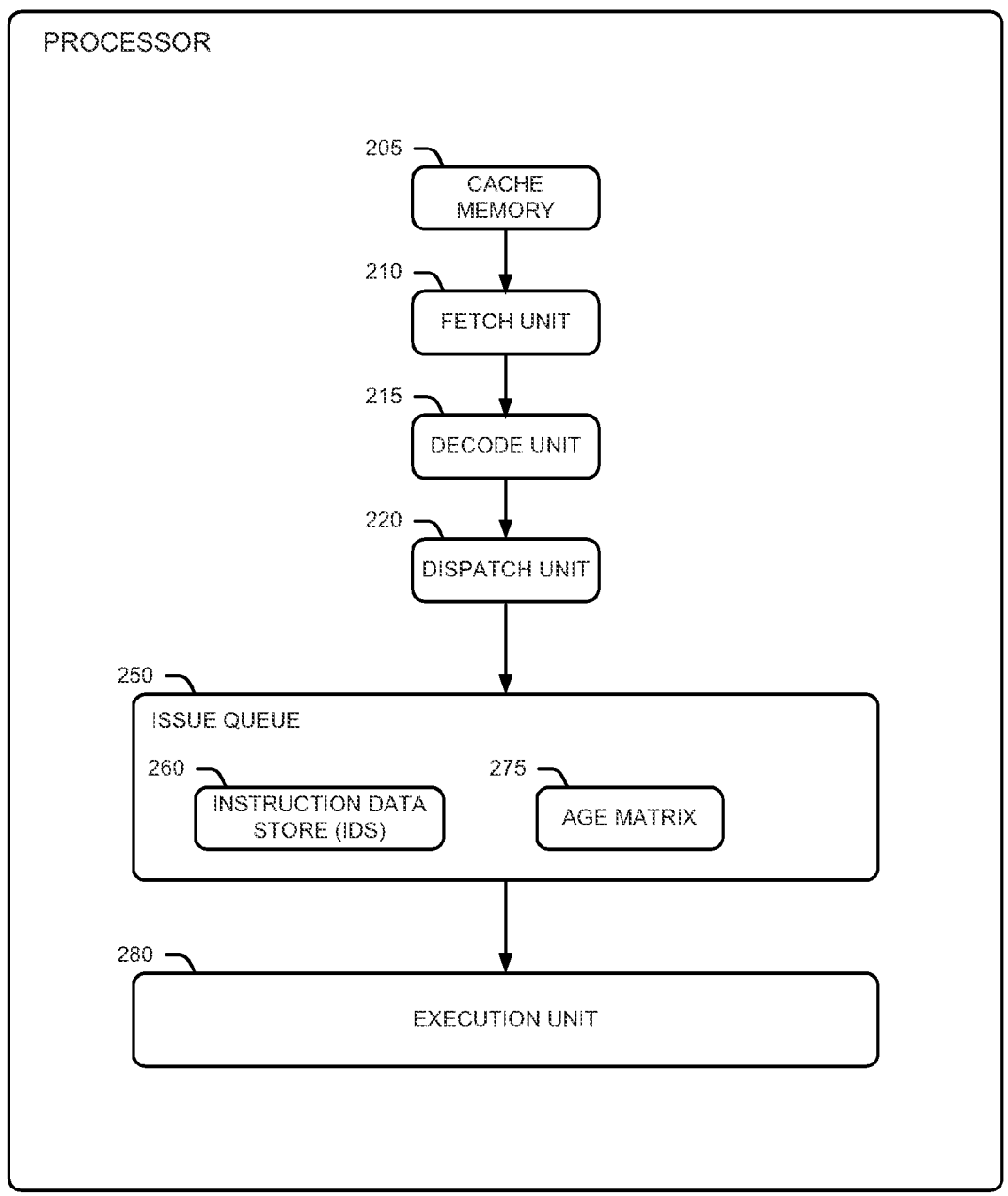
FIG. 2 is a block diagram showing more detail of the processor that employs IQ instruction age tracking methodology.

FIG. 2 shows a processor 200 that may employ the disclosed IQ instruction age tracking method. In that case, processor 200 performs the functional blocks of the flowchart of FIG. 6 described below that apply to the IQ instruction age tracking process. Processor 200 includes a cache memory 205 that may receive processor instructions from system memory 125, non-volatile storage 140, expansion bus 165, network interface 170, or other sources not shown in FIG. 2. Cache memory 205 couples to a fetch unit 210 that processor 200 employs to fetch multiple instructions from cache memory 205. Instructions may be in the form of an instruction stream that includes a series or sequence of instructions. Fetch unit 210 couples to a decode unit 215 that provides decoding of instructions as resources of processor 200 become available. Decode unit 215 couples to a dispatch unit 220. Dispatch unit 220 couples to an issue queue (IQ) 250.

In one embodiment, dispatch unit 220 dispatches one or more instructions to IQ 250 during a processor 200 clock cycle. IQ 250 includes an instruction data store (IDS) 260 that stores issue queue instructions. For example, an issue queue that stores 24 instructions employs an IDS 260 with 24 storage locations. IQ 250 includes an age matrix 275 that maintains or stores relative age data for each instruction within IDS 260. For example, if IQ 250 and more specifically IDS 260 maintains storage locations for 24 instructions of processor 200, age matrix 275 maintains relative age data for those 24 instructions. Age matrix 275, described in more detail below, may include row and column data that corresponds to each instruction entry in IDS 260. In one embodiment, age matrix 275 includes 24 rows and 24 columns of binary storage data for 24 entries or 24 instruction stores of IDS 260. IQ 250 couples to execution unit (EU) 280. EU 280 may include multiple execution units for execution of instructions from IQ 250 or other instructions.

Figure 3:
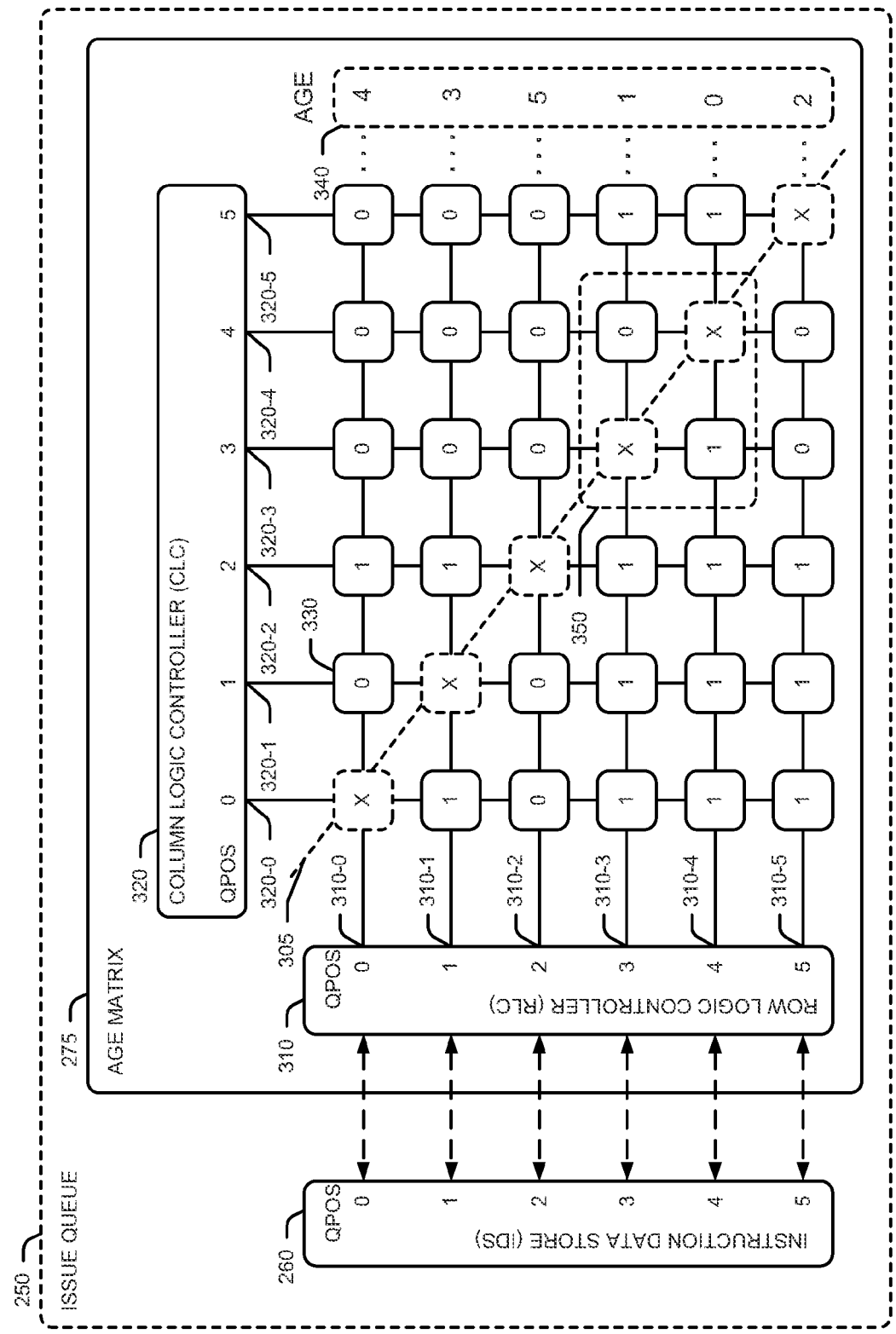
FIG. 3 is a black diagram depicting an issue queue (IQ) including an age matrix that employs the processor with IQ instruction age tracking methodology.

FIG. 3 shows more detail of age matrix 275 within issue queue IQ 250 that employs the IQ instruction age tracking methodology. In one embodiment, IDS 260 includes 6 locations or issue queue stores for IQ 250 instructions. Each location store or IDS 260 address exhibits a queue position (QPOS). For example, QPOS 0 through QPOS 5 may correspond to 6 respective instruction addresses or locations in IDS 260. In that case, age matrix 275 employs a 6×6 matrix of binary cells to maintain or store IDS 260 instruction age data. In that embodiment, age matrix 275 employs 6×6 or a total of 36 latches for the binary instruction age data storage. However, age matrix 275 may not employ binary cell data from cells that correspond to matching row and column positions such as the latches shown with corresponding QPOS row and QPOS column numbers. In one embodiment, age matrix 275 does not include those latches as shown in FIG. 3 that diagonal 305 depicts.

Diagonal 305 represents those latches that age matrix 275 may not include. In other words, age matrix 275 may not include each binary cell with a matching row and column number that describes the diagonal row of latches from the upper left to the lower right corner, namely diagonal 305 of the latches of age matrix 275, as shown in FIG. 3. In that case, the total number of binary cells includes 36 latches minus 6 latches or 30 total latches. FIG. 3 demonstrates one example of an age matrix array of latches in a 6×6 configuration of rows and columns. Each latch may store a binary "0" or "1 of data. Equation 1 below provides one method to determine the total number of memory cells or latches within an age matrix.

$$L=(N*N)-N \quad \text{EQUATION 1}$$

L=the total number of latches within age matrix 275
N=the total number of instruction storage locations in IQ 250

In one embodiment, IQ 250 includes IDS 260 with storage locations for 6 instructions. IQ 250 employs a 6×6–6 or 30 latch age matrix 275 as described by Equation 1 above. In other words, an N entry IQ employs an N×N age matrix that includes an array of latches that does not include those latches with matching row and column numbers, such as those latches of diagonal 305. Age matrix 275 manages the age data for each instruction within the N number of QPOS locations of IDS 260. As shown in FIG. 3, IQ 250 includes an IDS 260 with storage for 6 instructions at storage locations QPOS 0 through QPOS 5. Age matrix 275 includes a row logic controller (RLC) 310 to control the row data and clock functions for the latches of age matrix 275. The QPOS locations of IDS 260 correspond to the QPOS locations in RLC 310. RLC 310 generates row data and clock signals for QPOS 0 at row 310-0. In a similar manner, RLC 310 generates row data and clock signals for QPOS 1 through 5 at corresponding rows 310-1 through 310-5.

Age matrix 275 includes a column logic controller (CLC) 320 to control the column data and clock functions for latches of age matrix 275. The QPOS locations of IDS 260 correspond to the QPOS locations in CLC 320. CLC 320 generates column data and clock signals for QPOS 0 at column 320-0. In a similar manner, CLC 320 generates column data and clock signals for QPOS 1 through 5 at corresponding columns 320-1 through 320-5.

Age matrix 275 employs RLC 310 and CLC 320 to change or otherwise update the binary age data that corresponds to each instruction of IDS 260. Age matrix 275 employs 30 latches, such as a latch 330 to maintain or store digital binary age data. Age matrix 275 does not employ the 6 latches that correspond to the latches of diagonal 305. Latch 330 is one latch of age matrix 275 that maintains age data for the instructions of IQ 250. As shown in FIG. 3, latch 330 may temporarily store a logic "1" or logic "0". Each latch of age matrix 275 corresponds to one binary data element or cell that group together to store relative age data for each instruction of IDS 260.

Assume that processor 200 initializes and dispatch unit 220 starts dispatching decoded instructions to issue queue 250. Initially, the instruction data store (IDS) 260 and age matrix 275 of issue queue 250 are empty. While the following example employs a 6×6 age matrix 275 as shown in TABLE 1 and FIG. 3, the age information that populates age matrix 275 is different from the age data shown in FIG. 3 example. When dispatch unit 220 dispatches a first instruction to issue queue 250, issue queue 260 may store the first instruction in QPOS 0. In this instance, row logic controller (RLC) 310 and column logic controller (CLC) 320 cooperate to write all logic 2's to the 6 cells of age matrix 275 corresponding to QPOS 0 row and logic 0's to the remaining cells corresponding to QPOS 0 column. Thus, the cells of row 310-0 store the values X, 1, 1, 1, 1, 1, and the cells of column 320-0 store the values X, 0, 0, 0, 0, 0. In this case, the "X" term corresponds to the latch of diagonal 305 that age matrix 275 does not employ. The X is a "don't care" term. To determine the relative age 340 for the QPOS 0 instruction, issue queue 250 performs a test to determine if any cells exhibit a logic 0 in the row of age matrix 275 corresponding to QPOS 0, i.e. row 310-0. In this example, no cells of row 310-0 exhibit a logic 0 and thus age 340 column records or stores an age of "0" age units for the instruction in QPOS 0, as seen in TABLE 1 below.

TABLE 1

|        | QPOS 0 | QPOS 1 | QPOS 2 | QPOS 3 | QPOS 4 | QPOS 5 | AGE |
|--------|--------|--------|--------|--------|--------|--------|-----|
| QPOS 0 | X      | 1      | 1      | 1      | 1      | 1      | 0   |
| QPOS 1 | 0      |        |        |        |        |        |     |
| QPOS 2 | 0      |        |        |        |        |        |     |
| QPOS 3 | 0      |        |        |        |        |        |     |
| QPOS 4 | 0      |        |        |        |        |        |     |
| QPOS 5 | 0      |        |        |        |        |        |     |

Next assume that dispatch unit 220 dispatches a second instruction and that IDS 260 stores the second instruction in QPOS 1. In this case, row logic controller (RLC) 310 and column logic controller (CLC) 320 cooperate to write all logic 1's to the 6 cells of age matrix 275 corresponding to QPOS 1 row and logic 0's to the remaining cells corresponding to QPOS 1 column. Thus, the cells of row 310-1 store the values 1, X, 1, 1, 1, 1, and the cells of column 320-1 store the values 0, X, 0, 0, 0, 0 as seen in TABLE 2 below. In this example "X" refers to a non existent latch or a latch with a "don't care" value. In this manner, RLC 310 and CLC 320 cooperate to store a logic 0 in the cell of row 310-0 that corresponds to QPOS of the currently dispatching instruction in QPOS-1, namely the cell of row 310-0 in column 320-1 Thus, the cells of row 310-1 store the values 1, X, 1, 1, 1, 1. To determine the relative age 340 for the QPOS 0 instruction, issue queue 250 performs a test to determine if any cells exhibit a logic 0 in the row of age matrix 275 corresponding to QPOS 0, i.e. row 310-0. In this example, 1 cell of row 310-0 now exhibits a logic 0 and thus age column 340 records or stores an age of "0" age units for the instruction in QPOS 0. To determine the relative age 340 for the currently dispatched QPOS 1 instruction, issue queue 250 performs a test to determine if any cells exhibit a logic 0 in the row of age matrix 275 corresponding to QPOS 1, i.e. row 310-1. In this example, no cells of row 310-1 now exhibit a logic 0 and thus age column 340 records or stores an age of "0" age units for the instruction in QPOS 0, as seen in TABLE 2 below.

TABLE 2

|        | QPOS 0 | QPOS 1 | QPOS 2 | QPOS 3 | QPOS 4 | QPOS 5 | AGE |
|--------|--------|--------|--------|--------|--------|--------|-----|
| QPOS 0 | X      | 0      | 1      | 1      | 1      | 1      | 1   |
| QPOS 1 | 1      | X      | 1      | 1      | 1      | 1      | 0   |
| QPOS 2 | 0      | 0      |        |        |        |        |     |
| QPOS 3 | 0      | 0      |        |        |        |        |     |
| QPOS 4 | 0      | 0      |        |        |        |        |     |
| QPOS 5 | 0      | 0      |        |        |        |        |     |

Next assume that dispatch unit 220 dispatches a third instruction and that IDS 260 stores the third instruction in QPOS 2. In this case, row logic controller (RLC) 310 and column logic controller (CLC) 320 cooperate to write all logic 1's to the 6 cells of age matrix 275 corresponding to QPOS 2 row and logic 0's to the remaining cells corresponding to QPOS 2 column. Thus, the cells of row 310-2 store the values 1, 1, X, 1, 1, 1, and the cells of column 320-2 store the values 0, 0, X, 0, 0, 0 as seen in TABLE 3 below. RLC 310 and CLC 320 cooperate to store a logic 0 in the cells of the remaining rows 310-0 and 310-1 where those cells correspond to the QPOS of the currently dispatching instruction in QPOS-2, namely the cell of row 310-0 in column 320-2 and the cell of row 310-1 also in column 320-2. Thus, the cells of row 310-0 exhibit the values X, 0, 0, 1, 1, 1 for the QPOS 0 instruction The cells of row 310-1 exhibit the values 1, X, 0, 1, 1, 1 for the QPOS 1 instruction and the cells of row 310-2 exhibit the values 1, 1, X, 1, 1, 1 for the QPOS 2 instruction. To determine the relative age of the respective instruction corresponding to each of these rows, issue queue 250 performs a test to determine how many logic 0's each row includes. More logic 0's in a row correspond to higher instruction ages. To determine the relative age 340 for the currently dispatched instruction in QPOS 2, issue queue 250 performs a test to determine if any cells exhibit a logic 0 in the row of age matrix 275 corresponding to QPOS 2, i.e. row 310-2. In this example, no cells of row 310-2 now exhibit a logic 0 and thus age column 340 records or stores an age of "0" age units for the instruction in QPOS 2. Since 1 cell of row 310-1 stores a logic 0, age column 340 stores an age of "1" age unit at the location in age column 340 corresponding the instruction in QPOS 1. Since 2 cells of row 310-0 store a logic 0, age column 340 stores an age of "2" age units at the location in age column 340 corresponding to the instruction in QPOS 0.

TABLE 3

|        | QPOS 0 | QPOS 1 | QPOS 2 | QPOS 3 | QPOS 4 | QPOS 5 | AGE |
|--------|--------|--------|--------|--------|--------|--------|-----|
| QPOS 0 | X      | 0      | 0      | 1      | 1      | 1      | 2   |
| QPOS 1 | 1      | X      | 0      | 1      | 1      | 1      | 1   |
| QPOS 2 | 1      | 1      | X      | 1      | 1      | 1      | 0   |
| QPOS 3 | 0      | 0      | 0      |        |        |        |     |
| QPOS 4 | 0      | 0      | 0      |        |        |        |     |
| QPOS 5 | 0      | 0      | 0      |        |        |        |     |

Next assume that dispatch unit 220 dispatches another instruction and that IDS 260 stores this instruction in QPOS 5. In this case, row logic controller (RLC) 310 and column logic controller (CLC) 320 cooperate to write all logic 1's to the 6 cells of age matrix 275 corresponding to QPOS 5 row and logic 0's to the remaining cells corresponding to QPOS 5 column. Thus, the cells of row 310-5 store the values 1, 1, 1, 1, 1, X and the cells of column 320-5 store the values 0.0, 0, 0, 0, X, as seen in TABLE 4 below. RLC 310 and CLC 320 cooperate to store a logic 0 in the cells of the remaining rows 310-0, 310-1 and 310-2 where those cells correspond to the QPOS of the currently dispatching instruction in QPOS-5, namely the cell of row 310-0 in column 320-5, the cell of row 310-1 also in column 320-5, and the cell of row 310-2 also in column 5. Thus, the cells of row 310-0 exhibit the values X, 0, 0, 1, 1, 0 for the QPOS 0 instruction. The cells of row 310-1 exhibit the values 1, X, 0, 1, 1, 0 for the QPOS 1 instruction. The cells of row 310-2 exhibit the values 1, 1, X, 1, 1, 0 for the QPOS 2 instruction and the cells of row 310-5 exhibit the values 1, 1, 1, 1, 1, X for the QPOS 5 instruction.

As stated above, the "X" term corresponds to a latch that age matrix 275 either does not include or employ for tracking age data for the instructions of IDS 260, To determine the relative age of the respective instruction corresponding to each of these rows, issue queue 250 performs a test to determine how many logic 0's each row includes. To determine the relative age 340 for the currently dispatched instruction in QPOS 5, issue queue 250 performs a test to determine if any cells exhibit a logic 0 in the row of age matrix 275 corresponding to QPOS 5, i.e. row 310-5. In this example, no cells of row 310-5 now exhibit a logic 0 and thus age column 340 records or stores an age of "0" age units for the instruction in QPOS 5. Since 1 cell of row 310-2 stores a logic 0, age column 340 stores an age of "1" age unit at the location in age column 340 corresponding the instruction in QPOS 2. Since 2 cells of row 310-1 store a logic 0, age column 340 stores an age of "2" age units at the location in age column 340 corresponding the instruction in QPOS 1. Since 3 cells of row 310-0 store a logic 0, age column 340 stores an age of "3" age units at the location in age column 340 corresponding the instruction in QPOS 0.

TABLE 4

|        | QPOS 0 | QPOS 1 | QPOS 2 | QPOS 3 | QPOS 4 | QPOS 5 | AGE |
|--------|--------|--------|--------|--------|--------|--------|-----|
| QPOS 0 | X      | 0      | 0      | 1      | 1      | 0      | 3   |
| QPOS 1 | 1      | X      | 0      | 1      | 1      | 0      | 2   |
| QPOS 2 | 1      | 1      | X      | 1      | 1      | 0      | 1   |
| QPOS 3 | 0      | 0      | 0      |        |        | 0      |     |
| QPOS 4 | 0      | 0      | 0      |        |        | 0      |     |
| QPOS 5 | 1      | 1      | 1      | 1      | 1      | X      | 0   |

FIG. 3 depicts one example of relative instruction age data for the instructions of IDS 260 after issue queue 250 has been operating for some amount of time. Since issue queue 250 has been operating for some amount of time, issue queue 250 is full of instructions and age matrix 275 is full of age information. Each QPOS of IDS 260 fills with a respective instruction. Each row of age matrix 275 populates with age information relative to a respective instruction in IDS 260. Row logic controller (RLC) 310 and column logic controller (CLC) 320 cooperate to populate the rows of age matrix 275 with age information. In the example of FIG. 3, the row of binary data that corresponds to IDS 260 QPOS 0, or row 310-0 exhibits a sequence of binary data from left to right of X, 0, 1, 0, 0 and 0. In that case latch, 330 stores binary age data of "0" and the remaining latches of QPOS 0 row 310-0 store the remaining age matrix 275 data for that row.

FIG. 3 represents the latches of diagonal 305 as having an X value. Age matrix 275 may not employ latches that correspond to the positions of those latches of diagonal 305. In other words, RLC 310 of age matrix 275 maintains binary age data in row 310-0 for the QPOS 0 instruction of IDS 260. In one embodiment, age matrix 275 determines the relative age of each instruction within IDS 260 by a count of the number of zeros in each row. As shown in the age column 340, the number of zeros in row 310-0 for QPOS 0 is "4". In that case, the relative age of the instruction within IDS 260 at QPOS 0 is 4 with respect to the ages of all other instructions within IDS 260. In this particular embodiment, higher age numbers correspond to higher ages. In an alternative embodiment, higher age numbers may correspond to lower ages.

As described above, in one embodiment, IQ 250 may not use latches that correspond to common row and column numbers. For example, IQ 250 may not use the latch common to QPOS 0 row 310-0, and column 320-0. IQ 250 may not use the other common row and column latches, such as the latch common to QPOS 1 row 310-1, column 320-1 and so on as shown by the 6 latches of diagonal 305 of FIG. 3. IQ 250 may assume that the 6 latches of diagonal 305 from the top upper left to the bottom lower right of age matrix 275 are always representative of age data=X, or don't care. In that case IQ 250 may assume that data and not require a physical representation for those latches.

IQ 250 may interpret the data of RLC 310 row 310-0 for QPOS 0 as a total of 4 "0's" of binary data. In that case, the instruction of IDS 260 that corresponds to QPOS 0 exhibits an age=4. In other words, the instruction of IDS 260 in QPOS 0 has an age of 4. In one embodiment wherein each instruction of IDS 260 exhibits respective age data of 0 through 5, QPOS 0 is number 4 in age. An age matrix 275 age of 4 is older by 1 age unit than an age matrix 275 age of 3. An age matrix 275 age of 3 is older by 1 age unit than an age matrix 275 age of 2, and so forth. An age matrix 275 age of 0 age units is the "youngest" instruction of IDS 260 and consequently the youngest instruction of IQ 250. Age matrix 275 determines the binary age data of instructions in IQ 250 during instruction dispatch from dispatch unit 220 to IQ 250, as described in more detail below.

The latches, such as latch 330 of age matrix 275, that correspond to IDS 260 QPOS 1 store binary age data of 1, X, 1, 0, 0, and 0 in that order from left to right as seen in FIG. 3. From the second row of data, namely row 310-1, age matrix 275 may interpret the age of the QPOS 1 instruction as 3 units. For example, the number of zeros in RLC 310 "row QPOS 1" is equal to 3. The corresponding instruction in IDS 260 location QPOS 1 is age 3 as shown in age 340 data. In other words, RLC 310 of age matrix 275 maintains or stores binary age data in row 310-1 for the QPOS 1 instruction of IDS 260.

In a similar manner to QPOS 1 above, the latches of age matrix 275 that correspond to IDS 260 QPOS 2 store binary age data of 0, 0, X, 0, 0, and 0 in that order. From the third row 310-2 of data, age matrix 275 may interpret the age of the IDS 260 QPOS 2 instruction as 5 age units. For example, the number of zeros in RLC 310 row 310-2 for QPOS 2 is equal to 5. The corresponding instruction in IDS 260 at location QPOS 2 exhibits an age 5 as shown in the age 340 data. In the case where IDS 260 maintains 6 instructions and age data 0 through 5, age 5 corresponds to the oldest instruction of IDS 260. In other words, the instruction at QPOS 5 of IDS 260 is the oldest instruction to dispatch from dispatch unit 220 to IQ 250.

Age data may be a particularly important feature during instruction issue of instructions from IQ 250 to EU 280. When determining eligibility for instruction issue, processor 200 may determine that the oldest instruction that meets all other dependency characteristics during any particular clock cycle is most eligible for issue. In other words, the oldest instruction with no pending dependency factors is "issue ready" during the next processor cycle. In one embodiment, age matrix 275 may include a ready bit (not shown) that corresponds to each QPOS entry, such as the 6 QPOS positions QPOS 0 through QPOS 5 of age matrix 275. In this case, IQ 250 may employ ready bit data to determine a particular instruction's issue readiness. An issue ready instruction may require a valid ready bit and an age data of age matrix 275 corresponding to the oldest instruction. A particular row of cell data of age matrix 275 that includes all logic "0"s as data may represent the oldest instruction within IDS 260 of IQ 250. As processor 200 resources, such as execution units not shown of EU 280 are available, issue ready instructions issue from IQ 250 or other issue queues, not shown. Execution unit 280 executes the issue ready instructions to provide instruction processing results to processor 200. Instruction processing results may affect other instruction dependency data of instructions within IQ 250 or other issue queues, not shown, of processor 200.

The latches of age matrix 275 corresponding to IDS 260 QPOS 5 depict binary age data of 1, 1, 1, 0, 0, and X respectively. From the sixth row 310-5 of data, age matrix 275 may interpret the age of the QPOS 5 instruction of IDS 260 as 2 age units. For example, the number of zeros in RLC 310 row QPOS 5 is equal to 2. The corresponding instruction in IDS 260 location QPOS 5 exhibits age 2 as shown in the age 340 data. In one embodiment, dispatch unit 220 may dispatch multiple instructions to IQ 250 during a particular processor 200 clock cycle. For example, as shown in FIG. 3, dispatch unit 220 dispatches 2 instructions at the same time. More particularly, the instructions corresponding to QPOS 3 and QPOS 4 of IDS 260 dispatch during the same processor 200 cycle.

In that case, the latches of age matrix 275 corresponding to IDS 260 QPOS 3 and QPOS 4 depict binary age data for 2 instructions during dispatch from dispatch unit 220. The age matrix 275 QPOS 3 row 310-3 stores binary data of 1, 1, 1, X, 0, and 1. From that fourth row 310-3 of data, age matrix 275 may interpret the age of the QPOS 3 instruction as 1 age unit. For example, the number of zeros in RLC 310 QPOS 3 row 310-3 is equal to 1. The corresponding instruction in IDS 260 location QPOS 3 is age 1 as shown in the age 340 data. During the same dispatch operation, the age matrix 275 QPOS 4 row 310-4 stores binary data of 1, 1, 1, 1, X, and 1. From that fifth row 310-4 of data, age matrix 275 may interpret the age of the QPOS 4 instruction as 0 age units. For example, the number of zeros in RLC 310 QPOS 4 row 310-4 is equal to 0. The corresponding instruction in IDS 260 location QPOS 4 is age 0, or the "youngest" instruction as shown in the age 340 data. In the case where the instruction corresponding to QPOS 4 is younger in the data stream of processor 200 instructions than the instruction corresponding to QPOS 3, the instruction corresponding to QPOS 4 is younger or the youngest instruction of IQ 250.

In order to maintain a relative age corresponding to each instruction of IDS 260, age matrix 275 may modify the column data of latches as shown in FIG. 3 during an instruction dispatch from dispatch unit 220. For example, during the dispatch of instructions into IDS 260 QPOS 3 and QPOS 4, CLC 320 modifies the data of age matrix column 320-3 for QPOS 3 and column 320-4 for QPOS 4. In greater detail, during the dispatch of QPOS 3 and QPOS 4 instructions, age matrix 275 resets the latches of columns 320-3, and 320-4 to "0" except for the latches in rows 310-3, and 310-4 for the QPOS 3 and QPOS 4 positions.

In one embodiment, during the dispatch of instructions into IDS 260 QPOS 3 and QPOS 4, CLC 320 resets all latches of age matrix 275 that correspond to column QPOS 3 and QPOS 4 to "0" with the exception of those latches in the QPOS 3 row 310-3 and QPOS 4 row 310-4. In effect, each instruction other than those dispatching QPOS 3 and QPOS 4 instructions gains 2 zeros in their respective age matrix 275 rows. In that manner, age matrix 275 modifies all instructions other than the dispatching QPOS 3 and QPOS 4 instructions to be 2 older than they were prior to the last two instruction dispatches. Age matrix 275 maintains unique age data as shown in age column 340 information for each QPOS position and consequently each instruction of IDS 260.

The age matrix 275 diagram of FIG. 3 depicts an intersection 350 of latches. The intersection of latches corresponds to multiple QPOS instruction positions in IDS 260. In this example, intersection 350 depicts the inclusion of latches within the rows and columns that correspond to two dispatching instructions, namely QPOS 3 and QPOS 4. In other words, intersection 350 includes the latches of age matrix 275 that reside within the rows 310-3, 310-4 and the columns 320-3, and 320-4. In this case, intersection 350 includes a total of 4 latches. During dispatch of instructions QPOS 3 and QPOS 4, RLC 310 resets all latches within rows 310-3 and 310-4 to "1" with the exception of those latches within intersection 350.

IQ 275 and more specifically age matrix 275 updates the latches within intersection 350 with the relative age of any multiple dispatching instructions. For example, age matrix 275 updates the latch data of intersection 350 with relative binary age data for dispatching instructions QPOS 3 and QPOS 4. In more detail, age matrix 275 updates the top row latches of intersection 350 corresponding to QPOS 3 with binary data X, and 0. Age matrix 275 updates the bottom row latches of intersection 350 corresponding to QPOS 4 with binary data 1, and X. In this manner, the age matrix row 310-3 data reflects 1, 1, 1, X, 0, and 1. The age matrix row 310-4 data corresponding to QPOS 4 age data shows 1, 1, 1, 1, X, and 1 binary data.

The corresponding age 340 data for row 310-3 QPOS 3 is 1, and the age 340 data for row 310-4 QPOS 4 is 0, as shown in FIG. 3. QPOS 4 represents the "youngest" instruction, or the last to dispatch to IQ 250. Each QPOS of IDS 260 that age matrix 275 represents indicates a uniquely different age. In this manner, each particular instruction of IDS 260 corresponds to a relative age of 0 through 5 indicating the particular instruction's age relative to any other instruction of IDS 260. In one embodiment, an age 340 of 0 represents the youngest or last instruction to dispatch. The age 340 data equal to 5, represents the oldest instruction of IDS 260.

As a new instruction dispatches to IQ 250, RLC 310 updates each QPOS row of data, namely rows 310-0 through 310-5, to reflect each instruction's relative age to that of another instruction. However, each latch within age matrix 275 does not need to update. In fact, only the latches that correspond to the dispatching instruction or instructions corresponding rows and columns need to update. For example, during the dispatch of instructions for QPOS 3 and QPOS 4, only the rows and columns for QPOS 3 and QPOS 4 need to update or change binary state. Equation 2 below provides a formula that represents the total number of latches that age matrix 275 updates during the dispatch of any particular instruction.

$$X = (N+N)*Y - (Y*Y) \qquad \text{EQUATION 2}$$

X=the total number of latches that age matrix 275 updates during the dispatch of one or more instructions.
N=the total number of instruction storage locations in IQ 250
Y=the total number of dispatching instructions.

In the example of FIG. 3 as described above, the number of latches that age matrix 275 updates is (6+6)*2−(2*2) or 20 latches of the 30 total. The (Y*Y) term of Equation 2 above ensures that the latches of intersection 350 count only once during the generation of the X term. As the size of IQ 250 increases in instruction storage count, the ratio of X to the total latch count of N*N decreases. This decrease in X value yields a greater reduction in the total number of latches that update during instruction dispatch. If a particular latch in age matrix 275 is not going to update as a result of a dispatch operation for an instruction or instructions, then IQ 250 need not clock that particular latch. The reduction in latch updates corresponds to a reduction in clocking latches within age matrix 275. This reduction in latch clocking provides a corresponding reduction in power consumption by processor 200 during instruction dispatch from dispatch unit 220 to IQ 250. Row logic controller (RLC) 310 and column logic controller (CLC) 320 provide clocking signals to the latches of age matrix 275 as needed for updates. In one embodiment, row logic controller (RLC) 310 and column logic controller (CLC) 320 combine to form a row and column logic controller.

Figure 4:
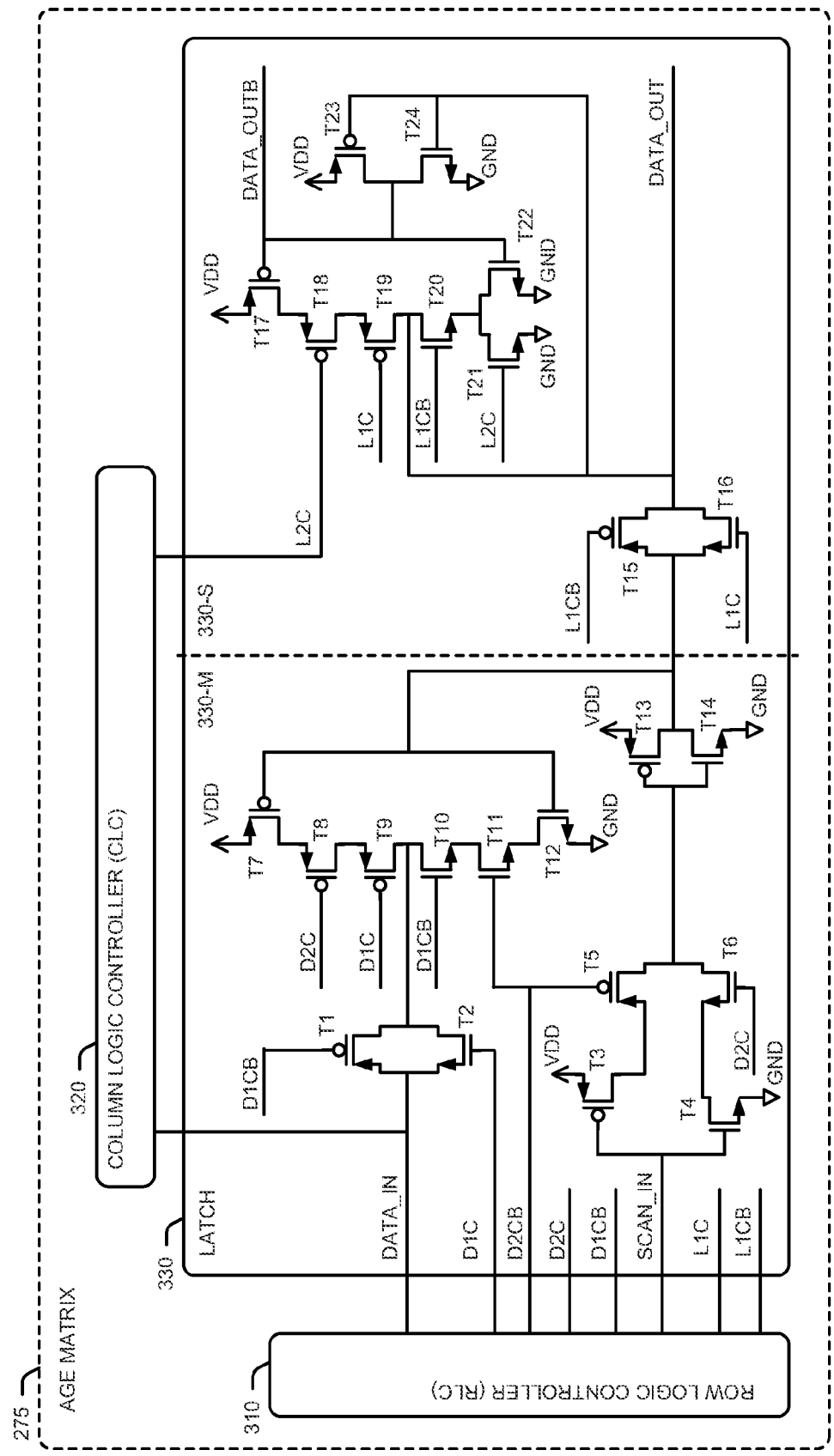
FIG. 4 is a block diagram that depicts details for one cell or storage element of the age matrix that employs the processor with IQ instruction age tracking methodology.

FIG. 4 depicts an age matrix latch logic diagram that shows more detail of latch 330 of age matrix 275 that employs the IQ instruction age tracking methodology. In one embodiment of the disclosed instruction age tracking method, latch 330 is one of multiple latches of age matrix 275. Latch 330 maintains a binary data storage of one portion of multiple binary data representing the instruction age of the IDS 260 instruction in the corresponding QPOS position. Age matrix 275 may modify latch 330 data by employing the logic of RLC 310 and CLC 320. During the dispatch of any particular instruction from dispatch unit 220 to IQ 250, age matrix 275 may modify the contents of latch 330 and other latches to reflect changing age relationship characteristics of each instruction of IQ 250.

RLC 310 and CLC 320 each couple to the source of a transistor T1 and the source of a transistor T2 to provide a DATA_IN signal input to latch 330. T1 and other transistors of latch 330 may be a field effect transistor (FET), N-channel, P-channel, metal oxide semiconductor field effect transistor (MOSFET), junction FET (JFET), or other type of transistor. RLC 310 provides clock signals D1C, D2C, and L1C to the circuitry of latch 330. As shown in more detail below, RLC 310 generates a clock signal D1CB as the complement of clock signal D1C. RLC 310 generates a clock signal D2CB as the complement of clock signal D2C. RLC 310 generates a clock signal L1CB as the complement of clock signal L1C.

RLC 310 provides clock signal D1C to the gate of T2. RLC 310 provides clock signal D1CB to the gate of T1. The source of a transistor T3 couples to the power source (not shown) or VDD of processor 200. The source of a transistor T4 couples to the ground (GND) of processor 200. The drain of T3 couples to the source of a transistor T5. The drain of T4 couples to the source of a transistor T6. RLC 310 provides clock signal D2C to the gate of T6. The source of a transistor T7 couples to VDD. The drain of T7 couples to the source of a transistor T8. RLC 310 provides clock signal D2C to the gate of T8. The drain of T8 couples to the source of a transistor T9. RLC 310 provides clock signal D1C to the gate of T9. The drain of T1 couples to the drain of T2, the drain of T9, and the drain of a transistor T10. RLC 310 provides clock signal D1CB to the gate of T10.

The source of T10 couples to the drain of a transistor T11. RLC 310 provides clock signal D2CB to the gate of T1 and to the gate of T11. The source of T11 couples to the drain of a transistor T12. The source of T12 couples to GND. The drain of T5 couples to the drain of T6, the drain of a transistor T13, and the drain of a transistor T14. The source of T13 couples to VDD. The source of T14 couples to GND. The gate of T7 couples to the gate of T12, the drain of T13, the drain of T14, the source of a transistor T15, and the source of a transistor T16. RLC 310 provides clock signal L1CB to the gate of T15. RLC 310 provides clock signal L1C to the gate of T16.

The source of a transistor T17 couples to VDD. The drain of T17 couples to the source of a transistor T18. CLC 320 provides clock signal L2C to the gate of T18. The drain of T18 couples to the source of a transistor T19. RLC 310 provides clock signal L1C to the gate of T19. RLC 310 provides clock signal L1CB to the gate of a transistor T20. The source of T20 couples to the drain of a transistor T21 and the drain of a transistor T22. RLC 310 provides clock signal L2C to the gate of T21. The source of T21 couples to GND. The source of T22 couples to GND.

The gate of T17 couples to the gate of T22, the drain of a transistor T23, and the drain of a transistor T24 to generate latch 330 output signal DATA_OUTB. The source of T23 couples to VDD and the source of T24 couples to GND. The gate of T23 couples to the gate of T24, the drain of T19, the drain of T20, the drain of T15 and the drain of T16 to generate output signal DATA_OUT of latch 330. Age matrix 275 may use the output signals DATA_OUT and DATA_OUTB (the inverse or complement of DATA_OUT) as read outs of latch 330. In other words, age matrix 275 may use a data read circuit (not shown) to read the contents of latch 330 at the signal output of DATA_OUT or DATA_OUTB. Age matrix 275 may also use the DATA_OUT signal to daisy chain the SCAN_IN signal through each of multiple latches of age matrix 275 for diagnostic or other purposes.

In one embodiment, RLC 310 provides a SCAN_IN signal input that may daisy chain or otherwise route from the input of each latch of age matrix 275 through to the output, such as signal DATA_OUT of each latch. For example, the output of latch 330, namely signal DATA_OUT may provide the input for the SCAN_IN signal to a next latch of age matrix 275 and so forth until all 30 latches of age matrix 275 that do not include those latches of diagonal 305 couple together in a daisy chain. That daisy chain of the SCAN_IN inputs may provide processor 200 the capability of diagnostic reading of all data from the latches of age matrix 275 and other features. RLC 310 provides the SCAN_IN signal to the gates of T3 and T4.

FIG. 5 shows a logic signal timing diagram for age matrix 275 of issue queue IQ 250 that employs the IQ instruction age tracking methodology. Clock signal D1C provides a clocking input signal to the latches of age matrix 275, such as latch 330. D1C is a half cycle clock. In other words, the pulse rate or frequency of the D1C signal is twice the pulse rate or frequency of the processor 200 cycle clock rate. Half cycle clock rates, such as those of D1C and others, provide processor 200 with the ability to conduct 2 operations, such as 2-stage data latching, during one normal processor clock cycle. D1CB is the inverse or complement of clock signal D1C. RLC 310 or other inverters not shown generate the inverted or complement clock signals for use by latch 330.

In one embodiment, latch 330 is a scannable master-slave latch with a clear function that clock signal L2C provides. The scannable feature provides latch 330 with the ability to read the contents of latch 330 without interfering with normal read and write operations in age matrix 275. The master-slave latch feature provides a two-stage latching mechanism within latch 330 for storage of age matrix 275 data using half cycle clocking as depicted in FIG. 5. The D1C clock signal controls the master 330-M portion of latch 330 that includes transistors T1 through T14 in normal operation by allowing data from the DATA_IN signal of RLC 310 to latch into the latch 330 during the period while DATA_IN is in a high state.

The D2C clock signal from RLC 310 provides SCAN_IN signal control by latch 330. RLC 310 may provide that only one of the D1C clock signal or D2C clock signal be high at the same time during the first half of the clock cycle of D1C, as shown in FIG. 5. In other words, if clock signal D1C is high in the first half of the clock cycle as shown in FIG. 5, then clock signal D2C is low during that same period. Both signals are low during the second half of the clock cycle as shown. However, if the clock signal D1C is low during the first half of the clock cycle, then clock signal D2C is high as shown by the dotted lines of D2C. RLC 310 generates an inverse copy or complement of clock signal D2C as D2CB.

RLC 310 generates clock signal L1C to control the slave portion 300-S of latch 330. The slave portion of latch 330 includes the transistors T15 through T24. RLC 310 generates an inverse copy or complement of clock signal L1C as L1CB. CLC 320 provides clock signal L2C to clear the slave 330-S portion of latch 330 when clock signal L1C is low. When clock signal L1C is high, the clock signal L2C has no effect on the slave 300-S portion of latch 330, and the latches of slave 330-S operate in a normal manner. In order for latch 330 to behave in a normal and predictable manner, the clock signal L2C transitions to a low state prior to clock signal L1C transitioning to a low state. That low state transition of clock signal L1C ensures that the slave 300-S portion of latch 330 is not set low unintentionally. CLC 320 provides a pulse clock signal L2C that exhibits a logic high during the second half clock cycle of clock signal L1C. In this manner, CLC 320 provides a L2C clock signal that is shorter than the second half clock signal of L1C to ensure proper latch 330 operation.

FIG. 6 shows a flowchart that describes one example of the disclosed IQ instruction age tracking method. The IQ instruction age tracking method starts, as per block 605. In one embodiment, dispatch unit 220 dispatches 2 instructions to IQ 250, as per block 610. In other words, during one processor cycle, dispatch unit 220 dispatches 2 instructions from the instruction stream of processor 200 at the same time. Per Equation 1 above, L=the total number of latches of age matrix 275. The total number of latches in age matrix 275 is 30 in the case where IDS 260 stores a total of 6 instructions.

In another embodiment, dispatch unit 220 may dispatch 4 or another number of instructions during the same processor clock cycle. IQ 250 may employ a 24 instruction store IDS 260. In that case, age matrix 275 includes a 24×24 array of latches that may exclude those latches corresponding to common QPOS row and column number, such as those of diagonal 305. Per Equation 1 above, L=24×24−24 or 552 latches in that case. In other words, the age matrix 275 of latches includes a total of 576 latches for store of relative age information for the corresponding IDS 260. In this case, age matrix 275 may not require the latches that correspond to each common QPOS row and column.

IQ 250 determines 2 queue positions (QPOS) within IQ 250 to write 2 dispatching instructions, as per block 620. IQ 250 determines the relative age of each of the 2 dispatching instructions, as per block 630. IQ 250 may determine the relative age of each instruction as consistent with the sequence or serial instruction order of instruction stream as processor 200 reads from memory of IHS 100 or other source. Per Equation 2 above, X=the number of latches of age matrix 275 that update to reflect the new age information for IQ 250. X=(6+6)*2−(2*2)=24−4=20. The number of latches of age matrix 275 that require update equals 24 latches out of a potential of 30 latches.

RLC 310 enables 2 QPOS rows of age matrix 275 latches, as per block 640. RLC 310 enables the corresponding row latches of age matrix 275 for those queue positions QPOS that IQ 250 determines as the storage locations for the 2 dispatching instructions. The 2 QPOS rows corresponding to the 2 dispatching instructions include 2*6 or 12 latches of age matrix 275. Latch data and logic controllers, such as RLC 310 and CLC 320, write age data into the intersection, such as intersection 350 of 2 QPOS row and column latches. RLC 310 and CLC 320 write age "1" data into the remaining portions of the 2 QPOS rows, as per block 650.

The intersection of 2 QPOS rows and columns, such as intersection 350, includes 2*2 or 4 latches. That intersection area maintains or stores the relative age of the 2 dispatching instructions, while age matrix 275 sets the remaining latches in the 2 QPOS rows corresponding to the 2 dispatching instructions equal to 1. In that manner, these 2 QPOS row latches of age matrix 275 reflect age data for the 2 youngest instructions of IQ 250. However the remaining rows or QPOS rows of data of age matrix 275 retain older age matrix 275 data and now require updating. To accomplish this updating, CLC 320 enables clocking and updating of the latches of the 2 QPOS columns that correspond to the 2 dispatching instructions and clears or sets to zero all remaining age matrix 275 latches in those enabled columns 320-3 and 320-4 except for those latches in intersection 350, as per block 660. This update operation or clearing operation consumes power. To conserve power, RLC 310 and CLC 320 may selectively clock only the latches of the age matrix rows and columns that the dispatching instructions affect, namely rows 310-3, 310-3 and columns 320-3, 320-4. RLC 310 and CLC 320 do not clock age matrix latches outside of rows 310-3, 310-3 and columns 320-3, 320-4 in this particular example. Thus, 20 latches of the 30 latches of age matrix 375 remain unclocked in this particular example.

In more detail, in the case where dispatch unit 220 dispatches 2 instructions, CLC 320 clears a total of 8 latches of age matrix 275 to "0". For example age matrix 275 may clear the latches of columns 320-3 and 320-4 for rows 310-0, 310-1, 310-2, and 310-5. In the case of a dispatch of 2 instructions into a 6 entry IQ, such as IQ 250, the total latches that age matrix 275 updates equates to 20 per Equation 2 above. In another embodiment, the issue queue maintains 24 instructions and dispatch unit 220 dispatches 4 instructions in one processor cycle. In that case, per Equation 2 above, the total number of latches that age matrix 275 updates is 176 out of a total of 576 latches. Many other IQ 250 instruction store sizes and age matrix 275 orientations configurations are possible depending upon the particular application. The issue queue instruction age tracking method ends, as per block 670.

The foregoing discloses methodologies wherein a processor may employ issue queue (IQ) instruction store operations during the dispatching of instruction by the dispatch unit. An age matrix of the IQ may manage the relative aging of instructions that reside within the IQ for later execution. During instruction dispatch, the age matrix updates binary age data in an array of latches or other memory cells to reflect the relative aging of out-of-order instruction issues. The age matrix may update a particular group of latches that reflect the changing age data and does not update or clock latches that do not require change. In this manner, processor 200 may consume less power through a reduction in clocking power during dispatch of instructions into IQ stores.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method of processing instructions, comprising:
receiving, by an issue queue, a set of dispatched instructions;
storing, by the issue queue, the set of dispatched instructions in an instruction data store (IDS) having a plurality of queue positions within the issue queue; and
managing, by the issue queue, a relative age of each dispatched instruction in the set of dispatched instructions stored in the IDS in an age matrix within the issue queue with respect to other dispatched instructions in the set of dispatched instructions stored in the IDS, wherein the age matrix includes a plurality of memory cells configured in a number of rows and a number of columns and wherein, during the dispatching of at least one dispatched instruction in the set of dispatched instructions, the issue queue:
stores the at least one dispatched instruction in the IDS,
updates the age matrix to reflect the age of the at least one instruction relative to other dispatched instructions in the IDS,
modifies the age matrix row memory cells to a first state and column memory cells to a second state corresponding to the at least one dispatched instruction's queue position to reflect the relative age of the at least one dispatched instruction with respect to other dispatched instructions in the IDS, and
for each row in the age matrix, modifies a relative age storage element with an age value corresponding to a sum of the memory elements having the second state, wherein the age value indicates the age of each dispatched instruction in the set of dispatched instructions in the IDS.

2. The method of claim 1, further comprising:
selectively clocking, by a row and column logic controller, a row and a column of the age matrix that correspond to the at least one dispatched instruction's queue position.

3. The method of claim 2, wherein the number of rows of memory cells in the age matrix equals the number of queue positions in the IDS, the number of columns of memory cells in the age matrix also being equal to the number of queue positions in the IDS.

4. The method of claim 1, wherein the at least one dispatched instruction includes first and second dispatched instructions such that, during dispatching of the first and second dispatched instructions, the IDS stores the first and second dispatched instructions in respective queue positions, and the issue queue modifies the age matrix to reflect the age of the first and second dispatched instructions relative to other dispatched instructions in the IDS.

5. The method of claim 4, wherein the age matrix exhibits an intersection of rows and columns of memory cells corresponding to the first and second dispatched instructions of the IDS, and wherein the intersection comprises four memory cells in a two-by-two matrix.

6. The method of claim 5, further comprising:
updating, by the issue queue, the rows of memory cells of the age matrix that correspond to the first and second dispatched instructions except for those memory cells in the intersection, with data to reflect the relative age of the first and second dispatched instructions with respect to other dispatched instructions in the IDS.

7. The method of claim 6, further comprising:
updating, by the issue queue, the columns of memory cells of the age matrix that correspond to the first and second instructions except for those memory cells in the intersection, with data to reflect the relative age of the first and second instructions with respect to other instructions in the IDS.

* * * * *